(12) United States Patent
White et al.

(10) Patent No.: US 10,337,486 B2
(45) Date of Patent: Jul. 2, 2019

(54) DIRECT DRIVE PORTABLE HYDROELECTRIC GENERATOR AND POWER SOURCE

(71) Applicants: William Jasper White, Ithaca, NY (US); Hunter Daniels Hartshorne, Ithaca, NY (US)

(72) Inventors: William Jasper White, Ithaca, NY (US); Hunter Daniels Hartshorne, Ithaca, NY (US)

( * ) Notice: Subject to any disclaimer, the term of this patent is extended or adjusted under 35 U.S.C. 154(b) by 0 days.

(21) Appl. No.: 15/676,061

(22) Filed: Aug. 14, 2017

(65) Prior Publication Data

US 2018/0045165 A1 Feb. 15, 2018

Related U.S. Application Data

(60) Provisional application No. 62/374,749, filed on Aug. 12, 2016.

(51) Int. Cl.
| | |
|---|---|
| *F03B 13/10* | (2006.01) |
| *F03B 17/06* | (2006.01) |
| *H02J 7/14* | (2006.01) |
| *H02K 7/18* | (2006.01) |
| *F03B 3/04* | (2006.01) |

(52) U.S. Cl.
CPC ............ *F03B 13/10* (2013.01); *F03B 3/04* (2013.01); *F03B 17/061* (2013.01); *H02J 7/1415* (2013.01); *H02K 7/1823* (2013.01); *F05B 2220/7068* (2013.01); *F05B 2240/12* (2013.01); *F05B 2240/13* (2013.01); *F05B 2240/14* (2013.01); *F05B 2240/20* (2013.01);
(Continued)

(58) Field of Classification Search
CPC .......... F03B 13/10; F03B 3/04; F03B 17/061; H02J 7/1415; H02J 7/1823; H02K 7/1823; F05B 2220/7068; F05B 2240/12; F05B 2240/13; F05B 2240/14; F05B 2240/20; F05B 2240/917
See application file for complete search history.

(56) References Cited

U.S. PATENT DOCUMENTS

| 1,326,730 A | 12/1919 | Helguera |
| 2,509,442 A | 5/1950 | Matheisel |
(Continued)

*Primary Examiner* — Tulsidas C Patel
*Assistant Examiner* — Joseph Ortega
(74) *Attorney, Agent, or Firm* — David G. Oberdick

(57) ABSTRACT

A generator device for generating an induced electrical power from the movement of a fluid stream. The generator device can include a circumferential casing that houses a stator, a power storage system and a power management system that receives the induced electrical power, and a propeller-rotor assembly located in the central opening of the casing and rotatably coupled to the casing. The propeller-rotor assembly has two or more propeller blades with distal ends opposite the axis of the propeller-rotor assembly to which magnets are attached. The device can also have a tether assembly for anchoring the generator device in a moving fluid stream and positioning the generator device so that the movement of fluid stream through the generator device causes the propeller-rotor assembly to rotate and, thereby, through interaction with the stator, to generate the induced electrical power. The generator device can be portable and easily deployed by a single user.

20 Claims, 12 Drawing Sheets

(52) U.S. Cl.
CPC ......... *F05B 2240/917* (2013.01); *Y02E 10/22* (2013.01); *Y02E 10/223* (2013.01); *Y02E 10/28* (2013.01)

(56) References Cited

U.S. PATENT DOCUMENTS

| | | | |
|---|---|---|---|
| 4,088,352 A * | 5/1978 | Kling | F03D 1/00 290/55 |
| 4,140,433 A | 2/1979 | Eckel | |
| 4,163,904 A | 8/1979 | Skendrovic | |
| 4,166,596 A * | 9/1979 | Mouton, Jr. | B64B 1/50 244/30 |
| 4,219,303 A * | 8/1980 | Mouton, Jr. | F03B 17/061 415/123 |
| 4,289,970 A | 9/1981 | Deibert | |
| 4,367,413 A | 1/1983 | Nair | |
| 4,720,640 A * | 1/1988 | Anderson | F03B 13/083 290/43 |
| 4,849,647 A * | 7/1989 | McKenzie | F03B 17/061 290/54 |
| 4,868,408 A | 9/1989 | Hesh | |
| 6,836,028 B2 * | 12/2004 | Northrup | H02K 7/183 290/44 |
| 7,471,009 B2 * | 12/2008 | Davis | F03B 3/1288 290/43 |
| 7,964,978 B1 | 6/2011 | Weissmann | |
| 8,022,567 B2 | 9/2011 | Davis et al. | |
| 8,222,762 B2 * | 7/2012 | Borgen | B63H 13/00 290/55 |
| 8,657,572 B2 * | 2/2014 | Presz, Jr. | F03D 1/04 415/227 |
| 8,674,538 B2 * | 3/2014 | Lugg | F03D 1/025 290/55 |
| 9,097,233 B1 * | 8/2015 | Ramsey | F03B 17/061 |
| 9,583,986 B2 | 2/2017 | Cawthorne et al. | |
| 2002/0088222 A1 * | 7/2002 | Vauthier | F03B 17/061 60/398 |
| 2003/0137149 A1 * | 7/2003 | Northrup | H02K 7/183 290/44 |
| 2006/0244264 A1 * | 11/2006 | Anderson | F03D 1/04 290/44 |
| 2008/0118411 A1 * | 5/2008 | D'Arinzo | A61L 2/202 422/186.09 |
| 2011/0274533 A1 * | 11/2011 | Presz, Jr. | F03D 1/04 415/1 |
| 2012/0038159 A1 * | 2/2012 | Chen | F03D 1/04 290/50 |
| 2012/0175877 A1 * | 7/2012 | Ives | F03B 13/264 290/42 |
| 2013/0009469 A1 * | 1/2013 | Gillett | H02J 3/30 307/25 |
| 2013/0236314 A1 * | 9/2013 | Feiler | F03B 11/02 416/177 |
| 2014/0062094 A1 * | 3/2014 | Chan | F03D 9/255 290/55 |
| 2014/0353971 A1 * | 12/2014 | Davey | F03B 11/06 290/52 |
| 2016/0013673 A1 * | 1/2016 | Workman | H01R 13/5202 320/114 |
| 2017/0110896 A1 * | 4/2017 | Gissin | H02J 7/0027 |
| 2018/0010573 A1 * | 1/2018 | Stahle | F03B 3/04 |
| 2018/0142668 A1 * | 5/2018 | Pacardo | F03B 17/061 |
| 2019/0120508 A1 * | 4/2019 | Goswami | F24F 3/1603 |

* cited by examiner

DIRECT DRIVE PORTABLE HYDROELECTRIC GENERATOR AND POWER SOURCE

CROSS-REFERENCE TO RELATED APPLICATIONS

This application claims priority to U.S. Provisional Application Ser. No. 62/374,749, filed Aug. 12, 2016, incorporated by reference herein in its entirety.

STATEMENT REGARDING FEDERALLY SPONSORED RESEARCH

Not applicable.

BACKGROUND OF THE INVENTION

Remote outdoor or wilderness locations often do not have accessible power sources that can be used to charge or power electronics. The most common approach to solve this problem of not having reliable access to electricity off the grid is the use of portable solar cells. Rechargeable external battery packs are also used as a supply of energy when outdoors, and, away from conventional energy sources. These solutions fail to adequately meet the needs of people in remote outdoor locations, however. In particular, micro solar solutions take long periods of time to charge and do not work at all times of the day. In addition, external batteries are nonrenewable making them useless weight once depleted. Hydroelectric generation has been a known and well-used power source, but, in general, this approach is not portable and easily deployed. Some small-scale, portable hydroelectric generators are available and on the market, but they use a fixed length flexible drive shaft to transfer power from a propeller in the body of moving water to generate electricity, and a storage system above water. This design limits the applications for the system, and also the locations where it can be deployed. The present invention provides solutions that overcome these shortcomings.

BRIEF SUMMARY OF THE INVENTION

In one preferred embodiment, the present invention comprises a portable casing that houses a hydroelectric generator assembly and an internal power storage component. The casing is water-submersible and the uses the power of moving water to generate electricity that, preferably, is stored internally in the casing for immediate or later use. As similar to large-scale hydroelectric generators, in certain embodiments this system would act in water. Unlike the large-scale hydroelectric generators, this present invention has a predetermined volumetric weight and sizes that allows the device to be portable and easily deployed by a user who is hiking or otherwise in a remote outdoor location. In one preferred embodiment, the hydroelectric generator assembly includes a stator coil assembly located inside a circumferential or toroid-shaped casing (which is waterproof), along with a power management, analysis, and storage component within the casing, and at least one propeller-rotor assembly rotatably positioned and mounted in a central opening of the casing. The propeller-rotor assembly includes a propeller with an array of propeller blades and (i) a distal ring with attached permanent magnets that surrounds and is attached to the distal ends of the propeller blades, or (ii) one or more permanent magnets fixedly attached to the distal ends of each propeller blade, such that the magnets rotate along with the propeller. In operation, the rotational plane of the propeller-rotor assembly is parallel to the plane formed by the perimeter of the circumferential or toroid-shaped casing and substantially perpendicular to the flow of water passing through the central opening of the casing. As water or other fluid passes through the central opening, the propeller of the propeller-rotor assembly turns, and the attached magnets pass by the stator coils inside the housing, thereby inducing a current. The current may be rectified or otherwise modified to provide a usable source of power. The power generated can be stored internally in the housing, for example in a battery or capacitor. Power from the generator system may be transferred to a consumption device via any suitable means, for example through power ports on the casing or through a tether to shore. The device of the present invention can have sites or mounts for attachment of one or more tethers to allow secure anchoring of the device within a moving stream of water. In an alternative embodiment, the device of the present invention further includes a fluid analyzing system.

DETAILED DESCRIPTION

Figure 1:
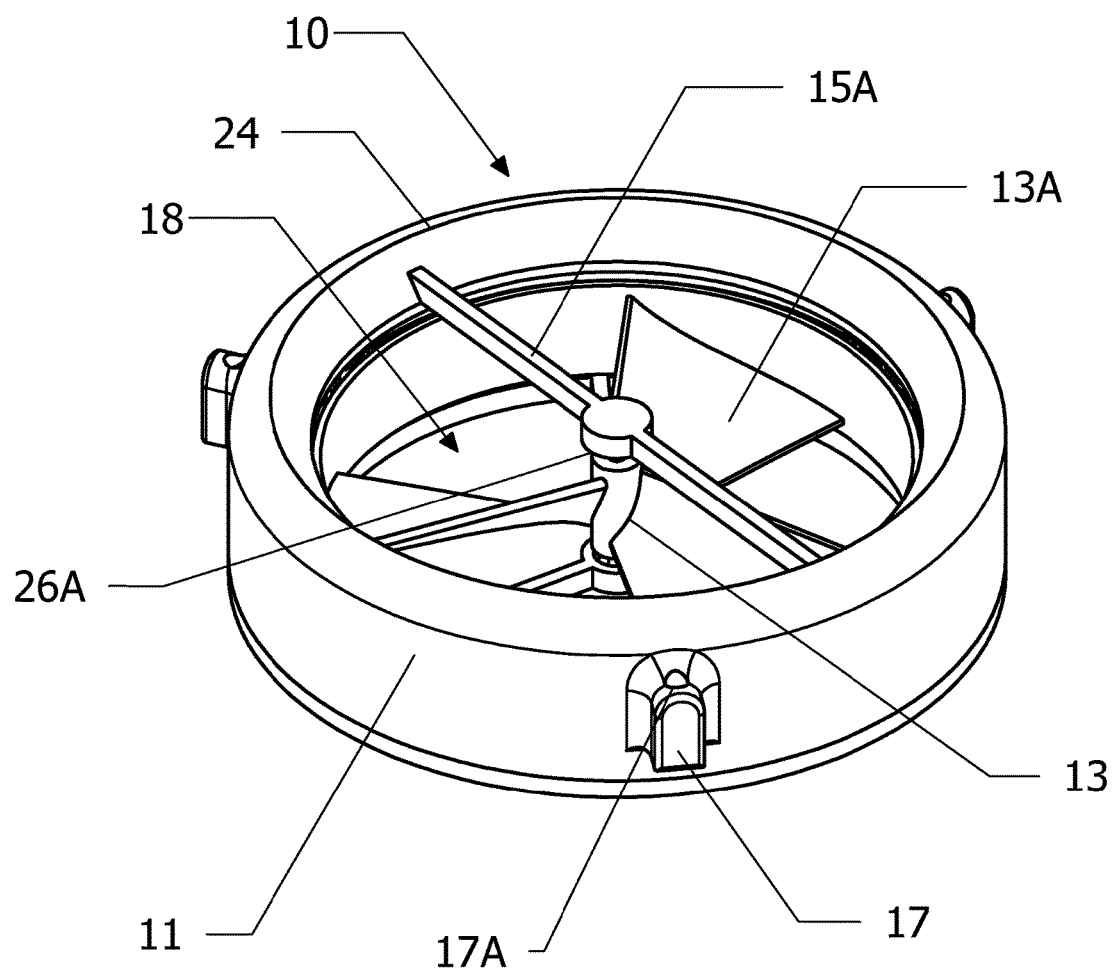
FIG. 1 is a top isometric view of a preferred embodiment of the hydroelectric generator device of the present invention.

Referring generally to FIGS. 1-10, one preferred embodiment of the portable hydroelectric generator device 10 of the present invention includes a circumferential or toroid-shaped, water-proof casing 11 with a channel 19 and a central opening 18. A propeller-rotor assembly 12 is rotatably mounted within the central opening 18 of the casing 11. The propeller-rotor assembly 12 includes a central propeller 13, with an array of propeller blades 13A and one or more magnets 14 mounted on a distal ring 31 that surrounds and is attached to the distal ends 13B of the propeller blades 13A. In another embodiment, an array of magnets 14 are fixedly attached to all of some of the distal ends 13B of propeller blades 13A. The propeller-rotor assembly 12 can be rotatably mounted on a shaft 16 attached to upper strut 15A and lower strut 15B that span and attach to casing 11. In other embodiments, the propeller-rotor assembly 12 can be rotatably mounted using, for example, an outer bearing system, and with no central shaft, in the propeller-rotor assembly 12. A stator 20, with an array of stator coils 20A, is located within channel 19 of casing 11, and magnets 14 and stator 20 both act together to provide a direct drive portable hydroelectric generator and power source. The generator device further includes a power storage component 21A inside casing 11, which stores and manages the generated electric power through, e.g., batteries and a related circuit board, and at least one power port 22 that allows a user to access and use the stored power. In certain embodiments, and as shown in FIGS. 4A and 4B, generator device also includes power ports 22, which are water sensitive and, therefore, sealed to the outside environment when not in use through the use of power cap 22A. The generator device may further include a power management and conditioning system 21B inside casing 11; which system is preferably a circuit board interconnected to the induced power supply, the power storage component, and any monitoring of the operations of device 10 and fluid flow 30 (such as through sensors 35A as shown in FIG. 4B).

Figure 7:
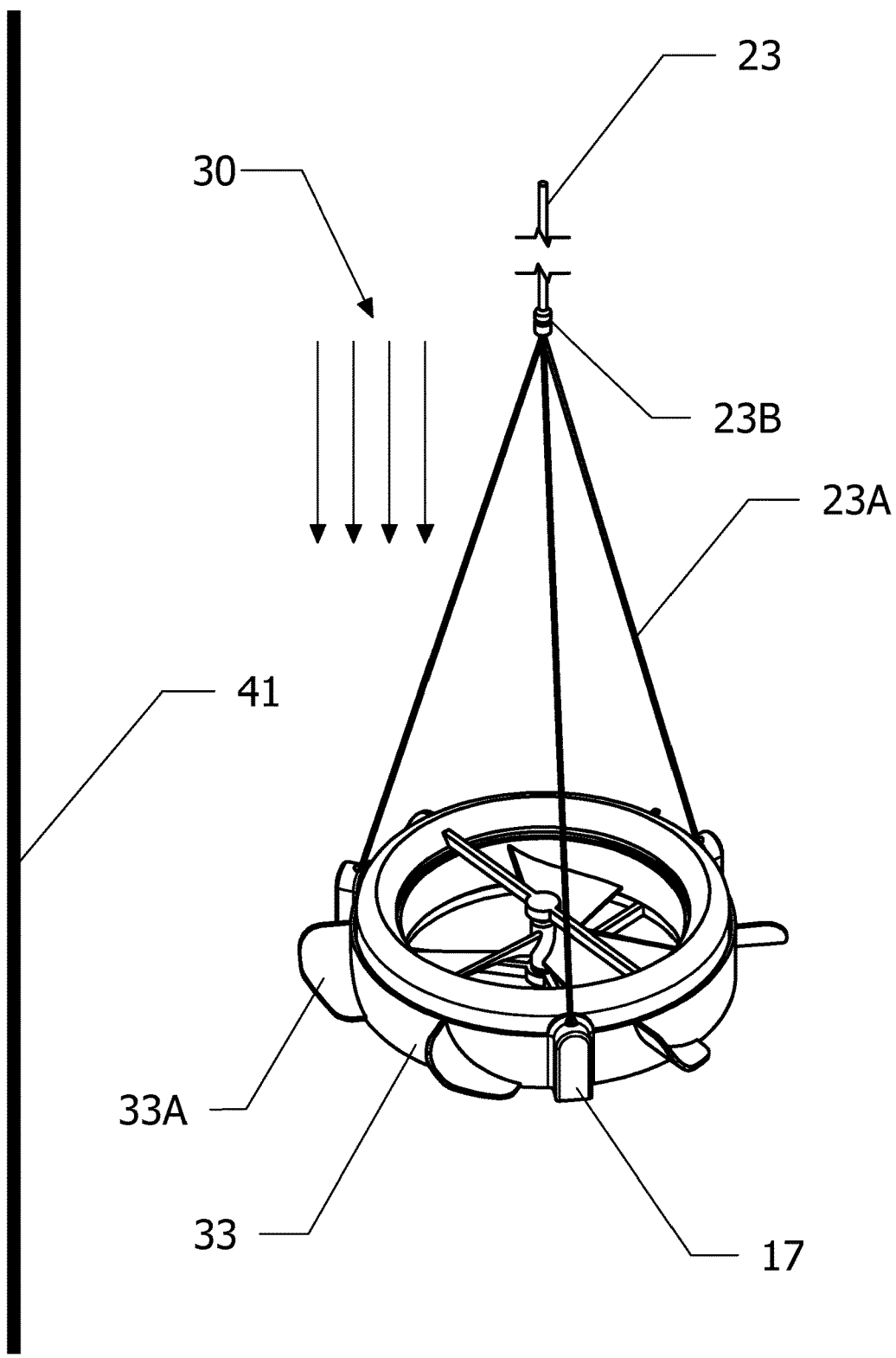
FIG. 7 is an expanded top isometric view of the device shown in FIG. 6, together with a tether assembly.
Figure 11:
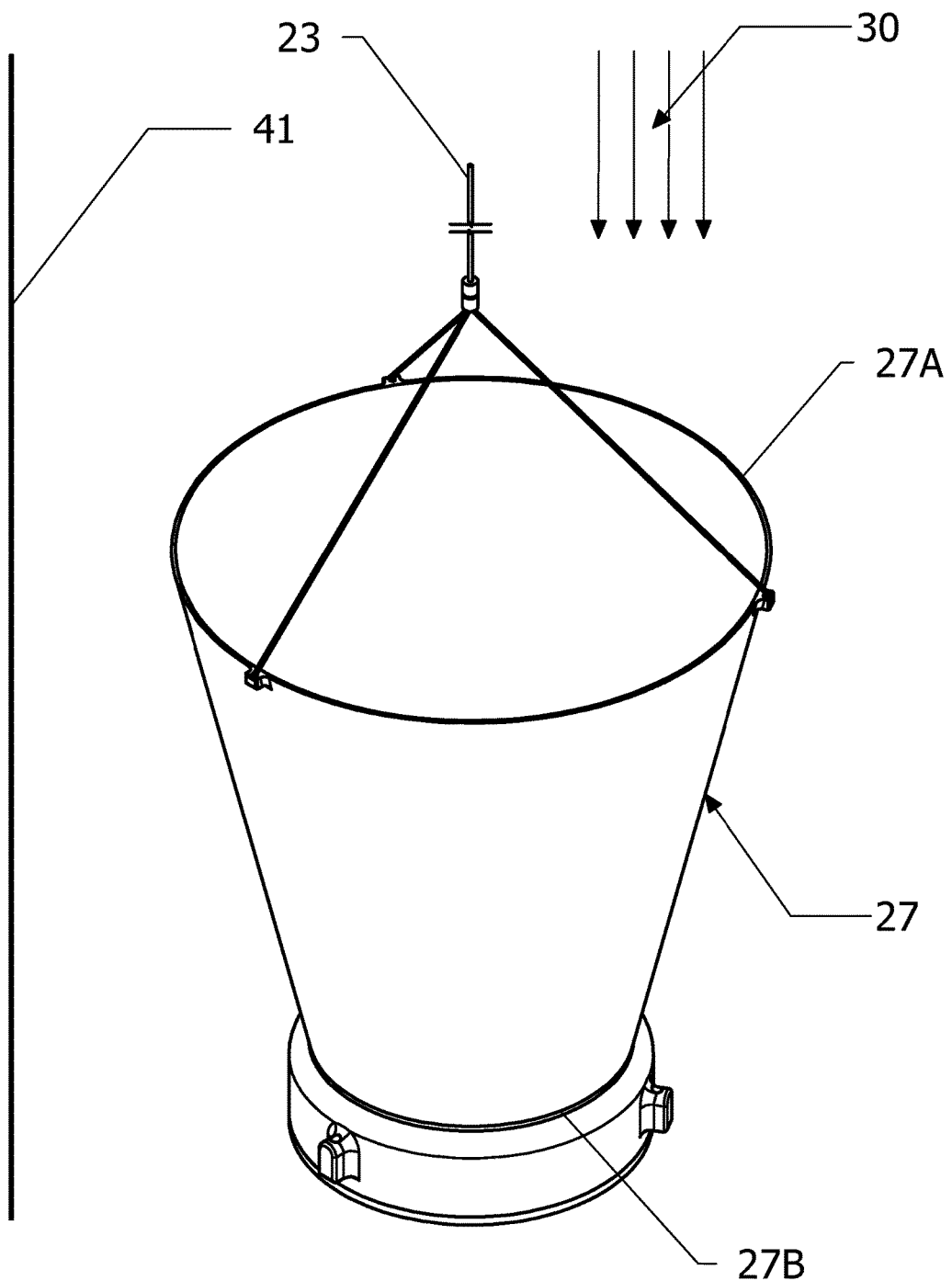
FIG. 11 is a top isometric view of the device shown in FIG. 2, with a cone included in the tether assembly.

More specifically, generator device 10 is portable and easily deployed in a stream or other moving water/fluid flow 30, as shown in FIGS. 7 and 11, such that device 10 is aligned with the fluid flow 30 of the fluid stream and partially or entirely below surface 41. As shown in FIGS. 7 and 11 generator device 10 is positioned in fluid flow 30 so that the rotational plane of the propeller-rotor assembly 12 is substantially perpendicular to flow 30. The rotational plane of the propeller-rotor assembly 12 is parallel to the horizontal plane of casing 11, and the stator coils 20A are fixed relative to the rotation of the propeller 13 and corresponding magnets 14 so that electric power is generated. To aid in the deployment of device 10 in one embodiment, a tether assembly 23, with tethers 23A, can attach to mounts 17 on casing 11. Tether assembly 23 can attach to a branch or rock along a stream bed, a post, a raft/boat or other available anchors. Alternatively, device 10 can be placed in a fluid stream without a tether assembly. Each of these components and their roles in the device are described in more detail below.

The Casing. As described above, and again referring to FIGS. 1, 2, 5, 9, and 12, casing 11 in one preferred embodiment of the generator device 10 of the present invention is designed to accommodate certain feature and perform several roles, including:

a) Casing 11 houses the stator 20 for the generation of electric power through interaction of stator coils 20A with the moving magnetic field created by rotation of the propeller blades 13A and attached magnets 14;

b) Casing 11 houses power management component 21B with circuitry and components known to those with skill in the art to manage, condition, and regulate the electrical power produced by the interaction of stator 20 with magnets 14, coordinate with power storage component 21A and interconnect with any operational or fluid flow analytical systems;

c) Casing 11 houses a power storage component 21A, for storing the generated electrical power, and, in alternative embodiments, related standard components for operational and power analysis;

d) Casing 11 houses one or more power access ports 22 to withdraw electrical power generated by or stored within the device; thereby providing a means for power extraction from device 10;

e) Casing 11 provides one or more sites for affixing a shaft 16 and central bearings 26A about which the propeller-rotor assembly 12 rotates;

f) Casing 11 includes external mounts 17, to which tether assembly 23 attaches for use in tethering the device 10 in a stream of moving fluid; and g) In certain embodiments casing 11 provides additional rotational movement and overall energy generation with the addition of secondary propeller blades 33A that are mounted to casing 11 and cause casing 11 to rotate in a direction opposite to the rotational direction of the propeller-rotor assembly 12.

Casing 11 preferably has a toroid shape, with a circular internal wall. The outside perimeter of casing 11 does not necessarily have to have a circular shape. The circular internal circumference of casing 11 enhances the rotational interaction between the stator 20 located within (or, in an alternative embodiment, fixed to) the casing 11 and the magnets 14 located on the distal ring 31 or at distal ends of propeller blades 13A. This rotational interaction between magnets 14 and the stator 20 provides the power generation in generator device 10. In a preferred embodiment, the stator 20 is fixedly mounted within the casing 11. However, because the stator 20 can be exposed to certain fluids, the stator does not have to be inside casing 11 and instead can be attached to a wall of casing 11 so that stator is adjacent to the rotational path of magnets 14 (power storage and management/conditioning components along with related circuitry are, at the same time, located with waterproof casing 11). The stator coils 20A, in certain embodiments, may face outward or away from the center of the casing geometry. In other embodiments, the stator coils stator may face inward or towards the center of the casing geometry. Any combination of the orientation of the stator coils 20A may be used while still adhering to the spirit of present invention. The fixed mounting of the stator 20 can be achieved by any known means such as mounting with fasteners, with adhesives, by potting, or by molding or casting the stator 20 into the casing 11 during manufacturing.

Figure 3:
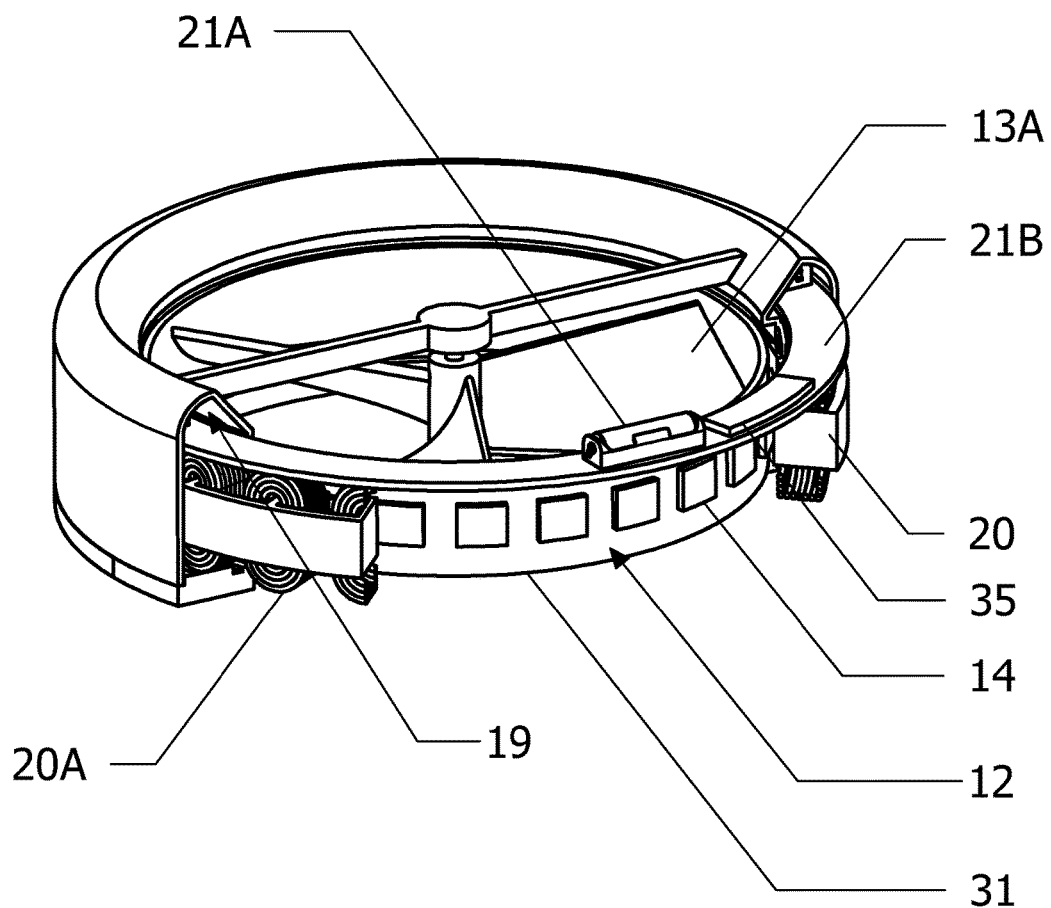
FIG. 3 is a cut-away top isometric view of the device shown in FIG. 1.
Figure 12:
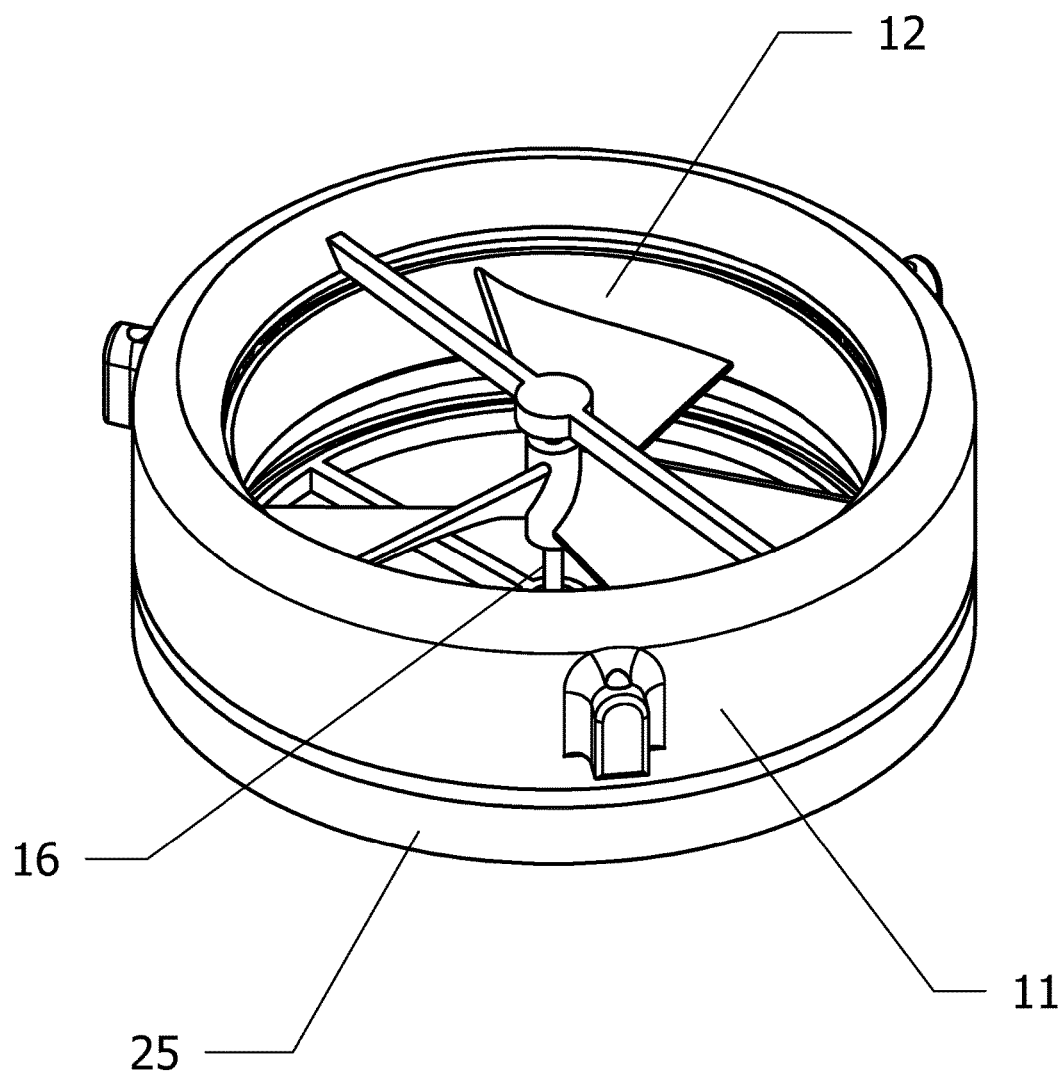
FIG. 12 is a top isometric view of the device shown in FIG. 1 with an additional power storage component.

Channel 19 within casing 11 also can be used to house and contain standard circuitry and components associated with the power conditioning and/or power storage components 21 in one or more locations. For examples, power storage component 21A and power management component 21B may be located adjacent to the stator 20 in a concentric arrangement, a circular arrangement above or below the stator 20, or between stator coils 20A. In one embodiment, as shown in FIG. 3, power management component 21B can be a circular circuit board on which power storage component 21A and fluid analysis system 35 are attached and which is electrically connected to the induced electrical power. Power management component 21B can include data measurement and collection system for measuring characteristics of the induced electrical current, the power storage component and the power management component. Alternatively, the casing 11 can include one or more mounted or attached modules 26, as shown in FIG. 12, that can expand power management and storage components 21B and 21A respectively. Module 26 can be located on the bottom side of casing 11, as shown in FIG. 12. Other locations for module 26 are possible, as well.

Casing 11 and module 26, if part of device 10, are water resistant so that water sensitive components contained within the casing 11 and module 26 (e.g., power storage component 21A and power management and conditioning components 21B) are substantially protected from infiltration of water. Preferably the casing 11 is both rigid and lightweight. The present invention places no particular limits on the materials of construction for the casing, but particularly suitable materials include but are not limited to: rigid plastics, light corrosion-resistant metals, composites, and any combinations of two or more of these.

While casing 11 preferably has a toroid shape, it will be understood this is but one embodiment, and other geometries that satisfy the functional requirements of the casing 11 within the overall device 10 could also be utilized without departing from the spirit of the present invention. In certain embodiments, the casing 11 is designed to minimize drag from contact of the casing 11 with the moving fluid when the device is deployed in a stream of moving fluid. For example, upper, current facing surface 24 of casing 11 can be angled to minimize drag when the device is placed in a moving fluid. In certain embodiments, upper surface 24 on the current-facing side of the casing 11 are angled toward the center of the device 10 such that fluid contacting the face of the casing 11 is directed toward the central propeller 13.

The casing also acts to present and position the propeller array of the propeller-rotor assembly 12 in a manner that maximizes the harnessing of the rotational energy of the propeller 13. More specifically, the rotational place of the propellers 13 of the propeller-rotor assembly 12 is substantially perpendicular to the fluid movement through the central opening 18 of casing 11. In a preferred embodiment, such positioning occurs through use of an attachment system comprised of an array of tethers that allow the device to be secured to its immediate or local environment. The most appropriate application of generation device 10 of the present invention is in a stream or body of moving water, but device 10 is applicable in any situation that involves a moving fluid relative to the device 10. Other applications of generator device 10 include, but are not limited to, streams, canoeing, kayaking, sailing, boating, aircraft power system, marine power system, fluid flow through a pipe, stream data collection, tidal, and river applications. Examples of environment of which to secure device 10 include, but are not limited to, a boat hull, a tree, stream bed, rock in the moving body of water, a stationary object on the shore, or even the body of an animal (for example a whale). Other attachment systems can also be used to accomplish the same purpose, such as, without limitation, a coupling to fix the casing into a pipe, an expandable cam that can be wedged between objects to form and anchor, a weigh based anchor that is dropped to the bottom of the fluid, or a stake that is driven in to the shore to form an anchor. Device 10 also can be otherwise placed and fixed in a fluid stream by securing placing device 10 against a rock or other fixed object in a manner that allows a fluid stream 30 to flow through device 10.

Figure 2:
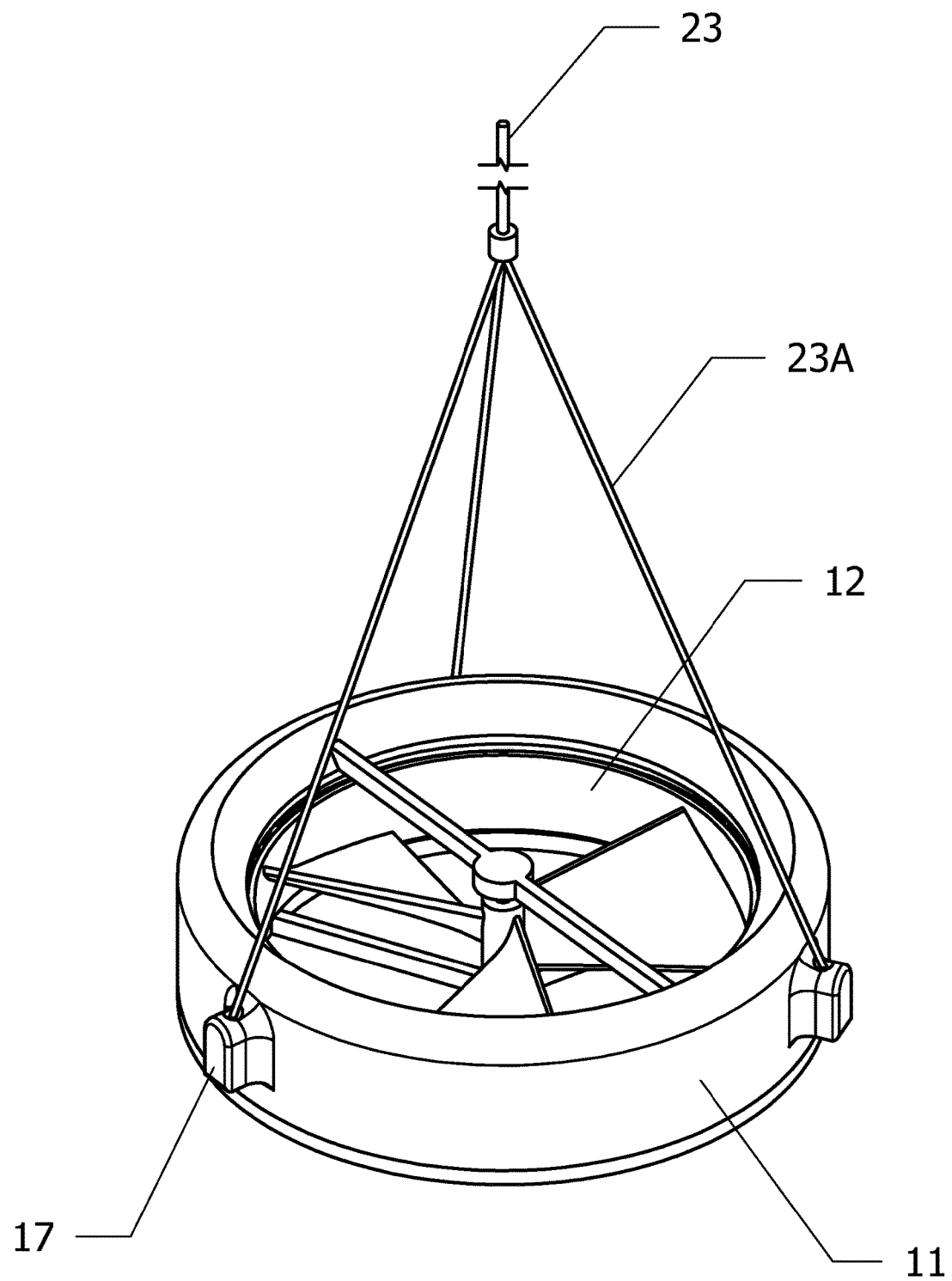
FIG. 2 is a top expanded isometric view of the device shown in FIG. 1, together with a tether assembly.

Tether Assembly. In one embodiment of the generator device of the present invention, the casing 11 includes sites or mounts 17 for attaching a tether assembly 23 at one end of one or more tethers 23A to casing 11. The other end of one or more tethers 23A are secured elsewhere to anchor and position the device within a moving stream of fluid. The mounts 17 have sufficient strength to resist the pulling forces created by the action of the fluid on the device and should be arranged in a geometry such that, when attached to tethers 23A, which, in turn, are anchored, the device 10 is held in an orientation to maximize action of the moving fluid on the propeller, i.e., substantially perpendicular to the fluid movement through the central opening 18 of casing 11. FIGS. 1 and 2 depict one possible arrangement of mounts 17, with three mounts 17 arranged symmetrically around the outer diameter of the casing 11. In one preferred embodiment the mounts 17 include holes 17A to facilitate attachment of tethers 23A to casing 11 to anchor the device 10 in a stream of moving fluid 30 as shown in FIGS. 7 and 11. It will be appreciated that the location of the mounts 17 as tethering sites and the specifics by which the tethers 23A are attached can be modified without departing from the spirit of the present invention. For example, more than three mounts 17 can be used and positioned symmetrically around the outer diameter of the casing 11, and other attachment means, besides holes 17A, can be used to attach tethers 23A. Mounts 17 also can be located on upper surface 24 of casing 11. As a further example, a single mount 17 can be located centrally on strut 15A and fixed (or detachably fixed) in front of shaft 16. Alternative attachment systems may be comprised, without limitation, of the following, either individually or combination: light cord connected to the device (used to attach to environment), spur, suction cup, or anchor. Additional attachment systems may be rigged to ensure safety of device. In one embodiment, and as shown in FIG. 7, the tether assembly 23 has a swivel bearing 23B to relieve stress on the system due to counter rotation of multiple propeller systems.

Figure 4A:
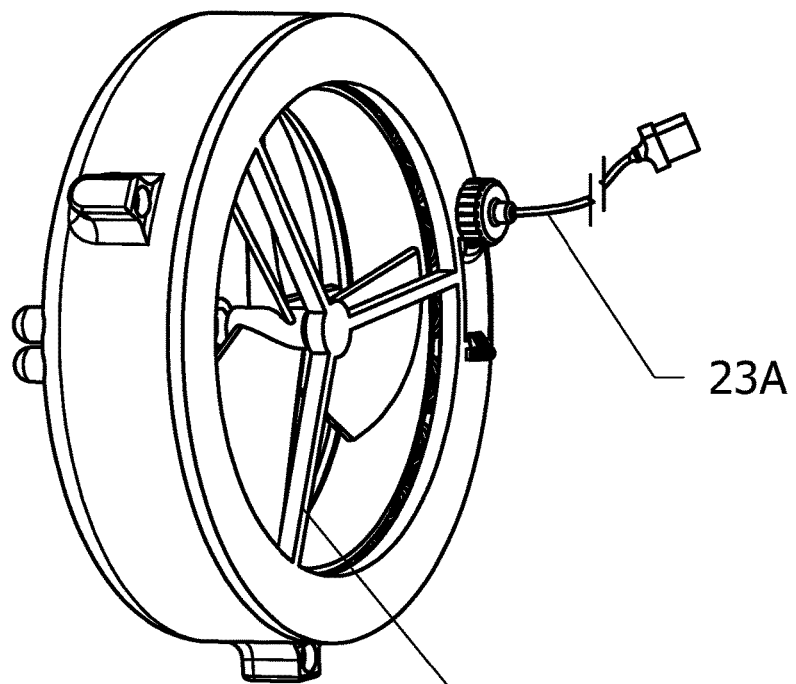
FIG. 4A is a bottom isometric view of an alternative embodiment of the device shown in FIG. 1, including a functional tether.

In certain embodiments, the tether assembly 23 functions beyond securing the casing 11. In particular, one or more tethers 23A can serve the dual purpose of securing the device 10 and/or transferring power and information from casing 11 to a user. For example, power generated by the generator system can be transferred to an external consumption unit via one or more tethers and be connected to a phone, stream research instruments, a lap top, lights, or a battery. Additionally, if the generator device is also used to sense and gather information concerning the fluid stream, such information also may be transferred, via one or more tethers 23A, to, by way of example but not limitation, a storage unit, a laptop, a phone. As shown in FIG. 4A, one or more tethers 23A may also be used to convey other information via a transmission wire or conduit that also acts as a tether, with such information including, but is not limited to, diagnostic information about the components in device 10, and information of the power levels in the power storage component 21A. When extended to shore or other secure location, tethers 23A may also act as a secondary or redundant means of attaching device 10 in a moving fluid stream (in the event that a primary attachment system fails).

Referring to FIG. 11, casing 11 can further include a cone or cone assembly 27 used to increase the velocity of fluid flowing through the central opening 18 of casing 11 and the propeller-rotor assembly 12. As used herein, the term cone assembly 27, includes a Bernoulli-type cone, and refers to any method or device used to enhance energy generation based on fluid dynamics. These dynamics may include but are not limited to fluid velocity, fluid rotation, fluid pressure, and/or fluid temperature. Alteration of fluid dynamics may take place inside, outside, or any combination of inside or outside the cone assembly 27 without decreasing the spirit of invention. As depicted in FIG. 11, cone 27 is attached to casing 11 in such a manner to receive fluid flow 30. Tethers 23A are attached to the mouth 27A of the cone 27 and, again, are used to position and anchor device 10. A Bernoulli-type cone 27 has a larger cross sectional area at the mouth 27A (the end farther away from the generator) than it does at the end close to the generator device 10, and this type and configuration of cone assembly 27 acts to increase the fluid velocity, and stabilize the flow 30 of the fluid through the propeller-rotor assembly 12. Indeed, the main purposes of the cone 27 include, but are not limited, to increasing the velocity of the fluid, e.g., water that passes through the propeller-rotor assembly 12, and stabilizing the flow 30 entering the propeller-rotor assembly 12 (in turbulent environments, the cone 27 can act to make the flow of the fluid 30 more stable to increase the efficiency of the generator device 10).

In one embodiment, the cone 27 is directly coupled to the generator device 10 with the side of the cone 27 with the smaller opening 27B being attached, by any known attachment means, to the generator device 10, and the mouth 27A of cone 27 attached to tethers 23A as shown in FIG. 11. In another embodiment, cone 27 is held in the fluid via a tether assembly 23 that attaches the small opening 27B of cone 27 to device 10, and the anchoring and positioning tether assembly 23 is attached to mouth 27A of cone 27. It will be appreciated that the method with which the generator device 10 and cone 27 are attached can be varied based on application environment without departing from the spirit of the present invention.

In another embodiment, the cross-sectional area of the inlet mouth or opening 27A of the cone (the side farthest from the generator device 10 with the larger cross-sectional area) can be adjusted to optimize the fluid velocity as well as but not limited to address fluid turbulence. In yet another embodiment, this adjustment can be done automatically based upon feedback and information from a fluid analysis system 35, associated with device 10, which monitors these fluid conditions. Such adjustment can also be done manually by a user based on reading and analysis of such fluid analysis information.

In another embodiment, the cone 27 can alter the direction of flow 30 to enhance rotational energy of the generator device 10. Methods to achieve this result include, but are not limited to, fins to displace water inside or outside the cone 27.

Cone 27 can be made of a flexible waterproof material such as, but not limited to, polyurethane, nylon, polyester, plastics, or rubber. Such materials allow the cone 27 to be more easily packed and transported. In other embodiments, cone 27 can be made of a stiff material such as, but not limited to, plastic, metal, or a combination thereof.

In another embodiment, the cone 27 can be used as the storage container for the casing 11 once removed from the fluid flow 30. In this embodiment once the device 10 is removed from the fluid flow 30, it can be stored within the cone 27, whereby cone 27 can act as a protective case for the device 10, and/or a waterproof barrier for the device 10 so that it does not become wet while being transported.

In another embodiment, the cone 27 can contain additional modules to enhance the use of the device. In this embodiment cone 27 once coupled with the casing will enhance the use of the device providing functions not limited to additional power storage, water purification, or light.

Propeller-Rotor Assembly. As described above, and referring generally to FIGS. 1-10, the direct drive portable hydroelectric generator device of the present invention includes a propeller-rotor assembly 12 comprised of propeller 13 with an array of propeller blades 13A and attached magnets 14. The primary function of the propeller-rotor assembly is to convert linear fluid motion into a rotating magnetic field which acts on the stator 20 to induce an electrical power. In any variation of coil and stator direction, magnet and rotation systems may be aligned in differing orientations so as to provide the greatest efficient method possible with the coils and stator. In the present invention, changes in the location of magnets 14 would likely impact and alter the configuration of the propeller-rotor assembly 12 and propeller 13. In a preferred embodiment, the propeller-rotor assembly 12 is located and rotatably mounted within the central opening 18 of the toroid-shaped casing 11. In other embodiments, the propeller-rotor assembly may be located outside of the casing. In yet other embodiments, the location of the propeller-rotor assembly may be located in any combination of areas inside and outside casing 11 while adhering to the spirit of the invention.

Figure 8:
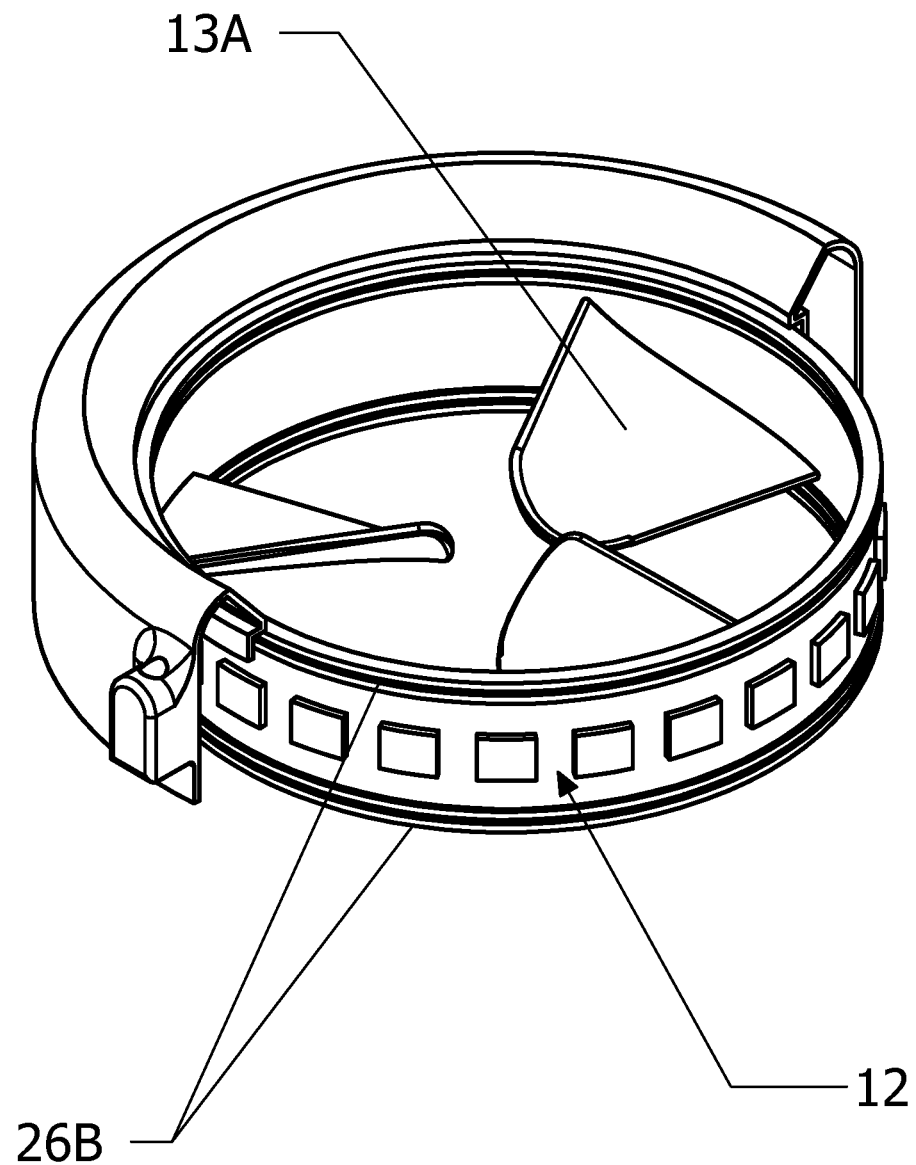
FIG. 8 is a top isometric cut-away view of an alternative embodiment of the hydroelectric generator device of the present invention with a propeller-rotor assembly rotatably mounted to the inner wall of a casing.

As fluid flows through the propeller-rotor assembly 12 and causes the associated propeller blades 13A to rotate, the translational energy of the fluid is converted to rotational energy of the propeller-rotor assembly 12. Each propeller 13 in propeller-rotor assembly 12 comprises two or more propeller blades 13A. As described above, one or more magnets 14 are fixed on distal ring 31 or on some or all of the distal ends 13B of propeller blades 13A. In one embodiment, the propeller-rotor assembly 12 is rotatably mounted on a shaft 16 and central bearings 26A in the center of the device 10 as shown in FIG. 1. In other embodiments, and as shown in FIG. 8, the propeller-rotor assembly is mounted (magnetic or mechanical) around the outer edge of the propeller-rotor assembly 12 (via known rotatable connections such as a slot or bearings 26B) as to rotate without the need for a central hub of the rotor or upper struts 15A or lower strut 15B on the casing 11. This embodiment can allow for debris to pass through the propeller-rotor assembly via an opening in the center of propeller-rotor assembly, which does not have a central hub or shaft as shown in FIG. 8, without getting caught up in the propeller-rotor assembly 12 or the struts 15A and 15B.

Figure 9:
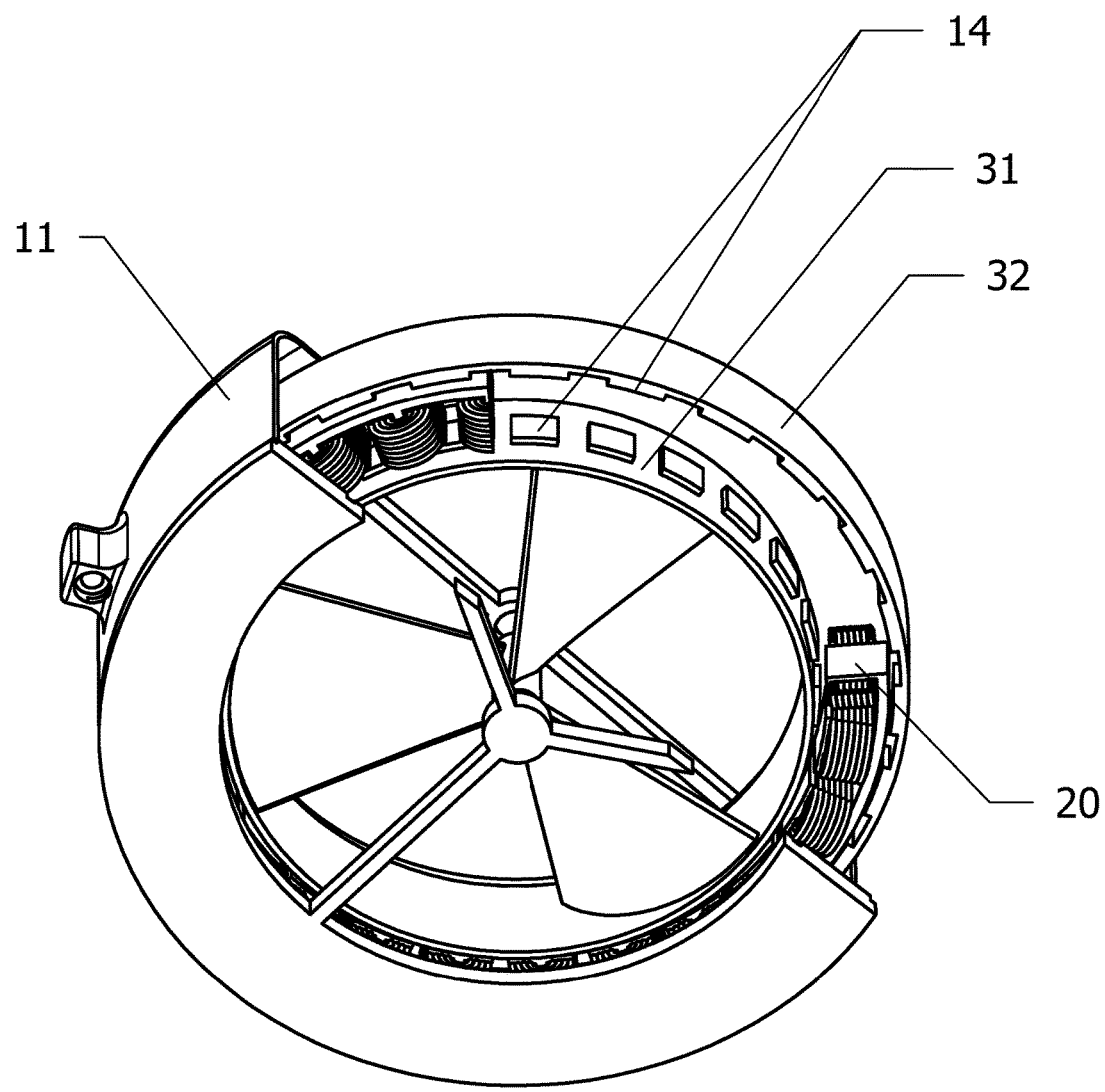
FIG. 9 is a bottom isometric cut-away view showing an alternative embodiment hydroelectric generator device of the present invention with inner and outer rings of rotating magnets.
Figure 10:
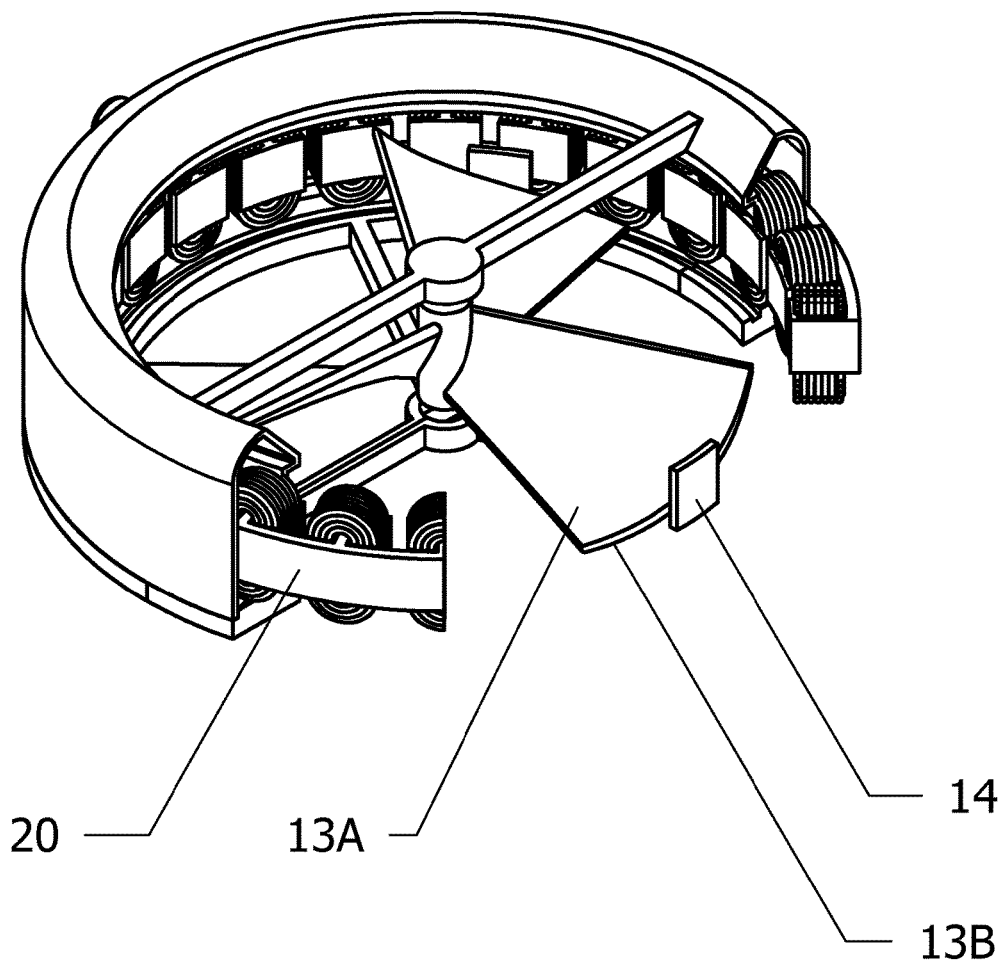
FIG. 10 is a top isometric cut-away view showing an alternative embodiment of the hydroelectric generator device in FIG. 1 with permanent magnets attached to the distal end of the propeller blades of the propeller-rotor assembly.

In alternative embodiments, propeller-rotor assembly 12 may include may include multiple rotor assemblies 12, i.e., two or more rotor assemblies, to optimize the generator device 10 for specific environments. In particular, the propeller-rotor assembly 12 can include two, three or four rotor assemblies. For example, and, as shown in FIG. 9, propeller-rotor assembly 12 can be associated with an inner ring 31 an outer concentric ring 32, upon which magnets 14 are fixed and that rotate on either side of the stator 20 (which may be located with channel 19 of casing 11).

The number of propeller blades 13A can also vary. In general, the propeller 13 in each propeller-rotor assembly 12 can have between two and twenty-four propeller blades 13A. In a most preferred embodiment, the propeller 13 in each propeller-rotor assembly 12 can have between three and twelve blades 13A. Finally, the number and placement of magnets 14 on propeller blades 13A can vary. In preferred embodiments, each propeller blade 13A of the propeller-rotor assembly 12 has one or more magnets 14 fixedly attached at the distal edge 13B of each propeller blade 13A. In a preferred embodiment, magnets 14 are placed on the distal ring 31, which is attached to the distal ends 13B of the propellers 13, with magnets 14 symmetrically arranged in such a configuration. Variation also can occur in magnet orientation. For example, in certain embodiments the permanent magnets 14 on the distal ends 13B of the propeller blades 13A can alternate poles. In other embodiments, the permanent magnets 14 can have the same poles facing outwards. In further embodiments, the permanent magnets 14 can be arraigned in any combination of orientation of poles facing outward.

In certain embodiments, there is a distal ring 31 around the distal ends 13B of the blades 13A of the primary propeller 13 as depicted in FIG. 3. Distal ring 31 acts as a surface on which to imbed, secure or contain the permanent magnets 14 of the propeller-rotor assembly 12 which is the magnet rotor for the generator.

Figure 5:
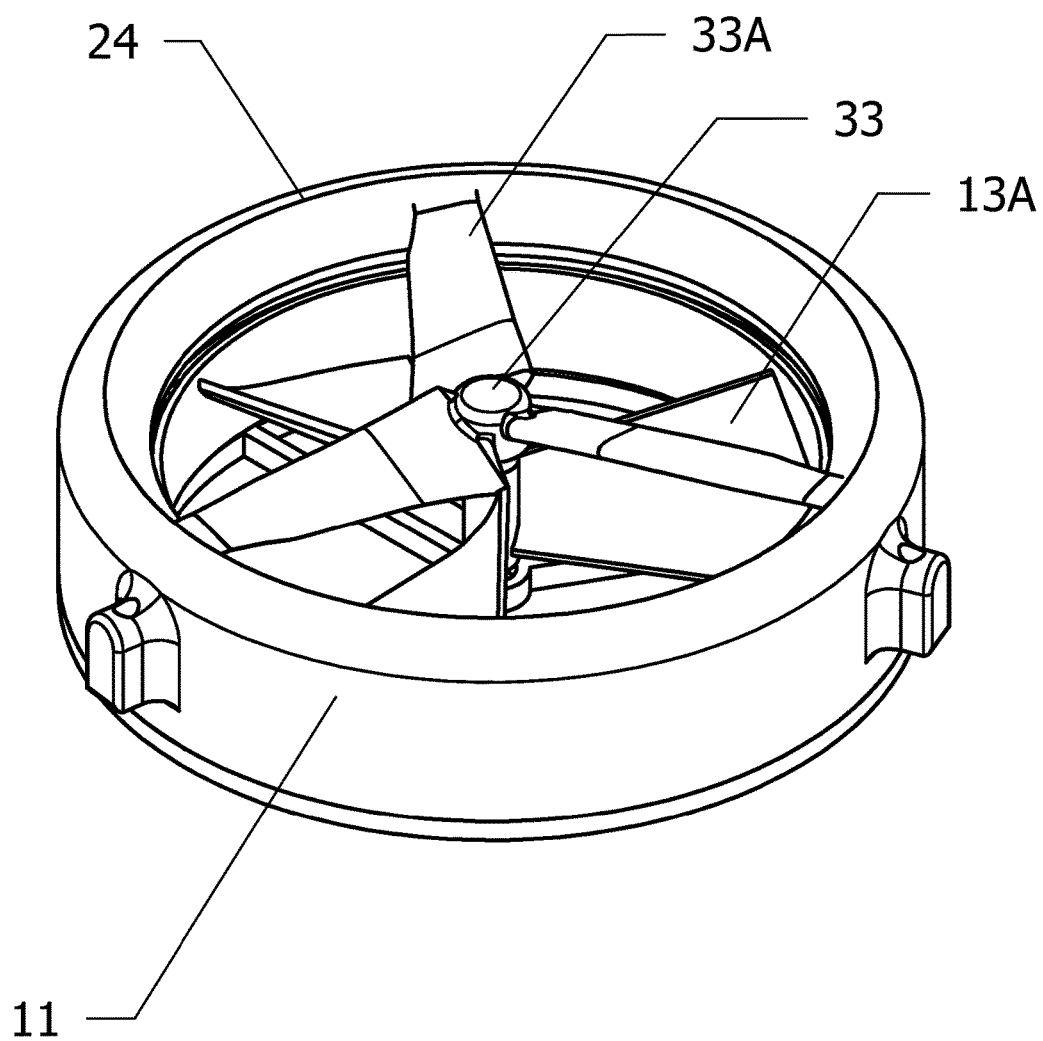
FIG. 5 is a top isometric view of an alternative embodiment of the hydroelectric generator device of the present invention with a secondary propeller.
Figure 6:
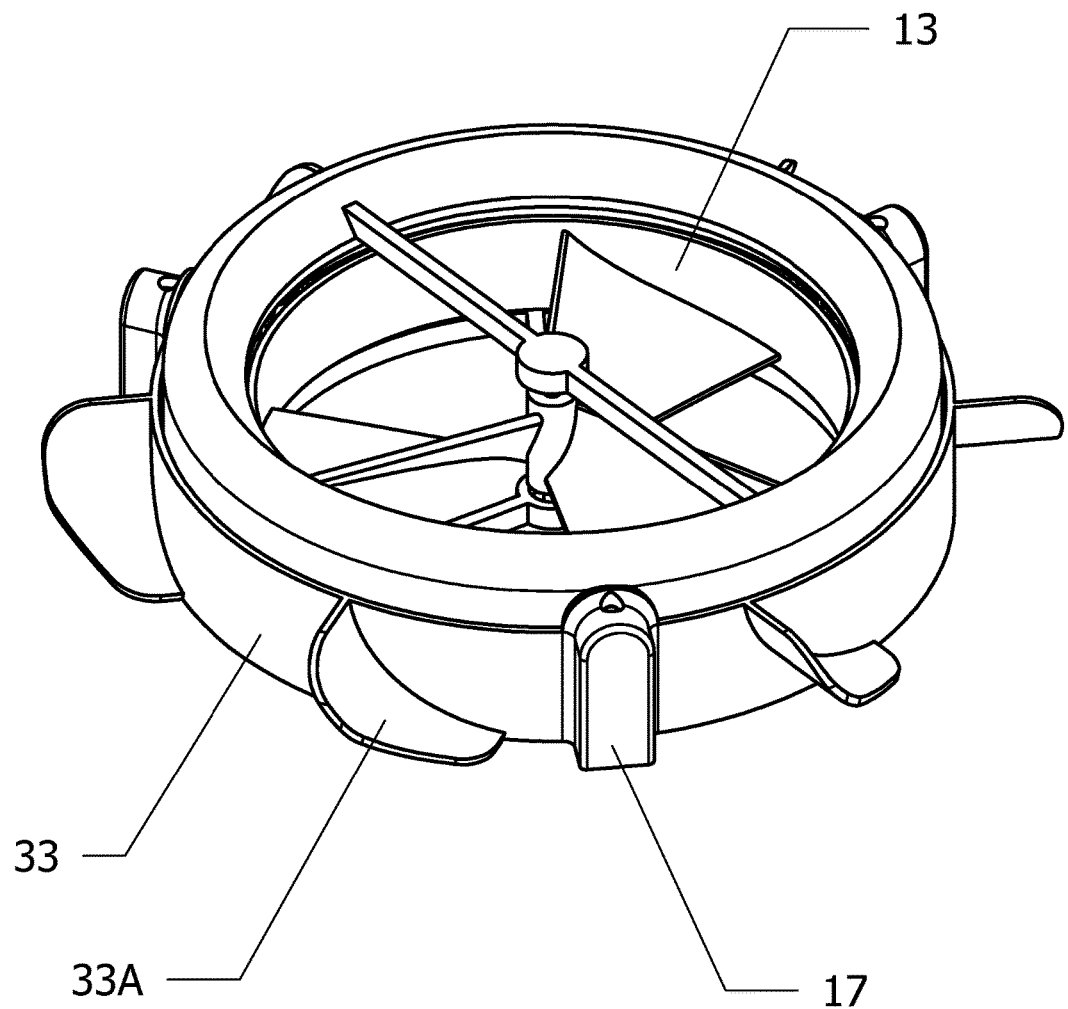
FIG. 6 is a top isometric view of an alternative embodiment of the hydroelectric generator device of the present invention showing a secondary propeller at a different location.

In other embodiments as shown in FIGS. 5, 6 and 7, the propeller-rotor assembly 12 includes secondary propellers 33. Secondary propellers 33 are differentiated from the primary propeller 13 in the propeller-rotor assembly 12 described above in that the secondary propellers do not contain magnets. The addition of secondary propellers 33 can lead to increased rotational energy of the propeller-rotor assembly 12 containing the magnets by causing casing 11 and stator 20 to rotate in a direction counter to the rotation of the propeller-rotor assembly 12. Inclusion of such secondary propellers 33 can lead to higher electrical energy generation than by using a primary propeller-rotor assembly 12 alone given the same linear flow energy. In one embodiment, and as shown in FIG. 6, a secondary propeller 33 is provided by placing blades 33A on the outer circumference of casing 11 (it is possible in this embodiment to remove secondary propeller system 33 when desired. In an alternative embodiment, as shown in FIG. 5, secondary propeller 33 is fixed on the top surface 24 of casing 11. In embodiments having secondary propeller 33, a swivel bearing 23B can be integrated into the tether system 23 to allow for counter rotation without twisting of the tether system 23.

The propeller-rotor assembly 12 is preferably made of a durable material to withstand debris in the fluid flow and travel wear from user. Such materials may include, but are not limited to, plastic, rubber, metal, carbon fiber or any combination of two or more of these.

Stator and Related Generator System. As previously discussed, the stator 20 is fixed to the casing 11. In one embodiment, the stator 20 is totally enclosed within the casing 11 as to not allow contact with the fluid which the device is submerged or partially submerged in. In another embodiment, the stator 20 is fixed to the casing but not fully enclosed within it, and the induced current induced is transferred to the water sensitive power storage and management components 21A and 21B encapsulated by the enclosed waterproof portion of the casing 11. More specifically, the induced power is transferred to the water sensitive power management and storage components 21A and 21B via a watertight method through the wall of the casing 11, such as, but not limited to, a sealed insulated set of wires.

An induced electrical current is generated on the stator coils 20A through rotation of the propeller-rotor assembly 12. The type of stator composition and number of coils 20A, as a generator system, can vary while still remaining true to the spirit of the invention. In certain embodiments, the stator 20 can be of a slotted design as depicted in FIG. 3, with the insulated conductor being coiled around the numerous individual ferrous teeth. In certain embodiments, the stator can be a spotless design, wherein the insulated conductor has no ferrous center. In FIG. 3, for example, the generator device 10 has twenty four stator coils 20A (if the cut-away is expanded to show all stator coils 20A). The number of corresponding magnets 14 in the propeller-rotor assembly 12 can be equal to, less than, or greater than the number of stator coils 20A. The number and configuration of magnets 14 and stator coils 20A also can be varied to optimize the system for different fluid velocities, rotor sizes, and environments. The number of stator coils 20A, as well as the number of turns of each coil, also can vary and be adapted as known by those with skill in the art. As also known to those with skill in the art, each stator coil 20A is made up of coils wrapped around a ferrous or nonferrous material depending on the desired power output, weight, size, and desired manufacturing technique of the generator device 10. The stator 20 outputs a voltage and current which can be regulated by the internal power management component 21B.

In a preferred embodiment, the stator coils 20A are connected in a three-phase star pattern. In other embodiments, the stator coils 20A may be connected in different winding patterns to optimize the system for different fluid velocities, rotor sizes, and environments. Some winding patterns include, but are not limited to, WYE, ABC, Star, or Delta.

Power Storage and Management Components. The generator device 10 preferably includes a power storage component 21A and a power management/conditioning system 21B that manages the electric power generated from the stator array 20 for use immediate or later use. The power storage and management components are preferably located within the waterproof casing 11. In this respect, a waterproof casing 11, and, where applicable, module 26, provide a protected environment for the electronic systems associated with the power management and storage components respectively 21A and 21B and any power rectifying circuitry (all of which is standard and know to this with skill in the art).

The size, shape, and type of power storage and management 21A and 21B are variable based on user application and power needs. Examples include, without limitation: lithium ion batteries, hydrogen fuel cells (note, additional hydrolysis reactor is included), nickel cadmium batteries, nickel-metal hydride batteries, and lithium polymer batteries. The power management component 21B connects to and manages the electrical energy generated by the stator 20 in combination with rotor 12 and preferably is a circuit board. More specifically, the power management component 21B has many functions, as known to those with skill in the art; these functions include but are not limited to, rectifying the output from the stator 20, giving a usable power output to the power storage component 21A, as well providing an output ports 22 for external consumption devices.

Figure 4B:
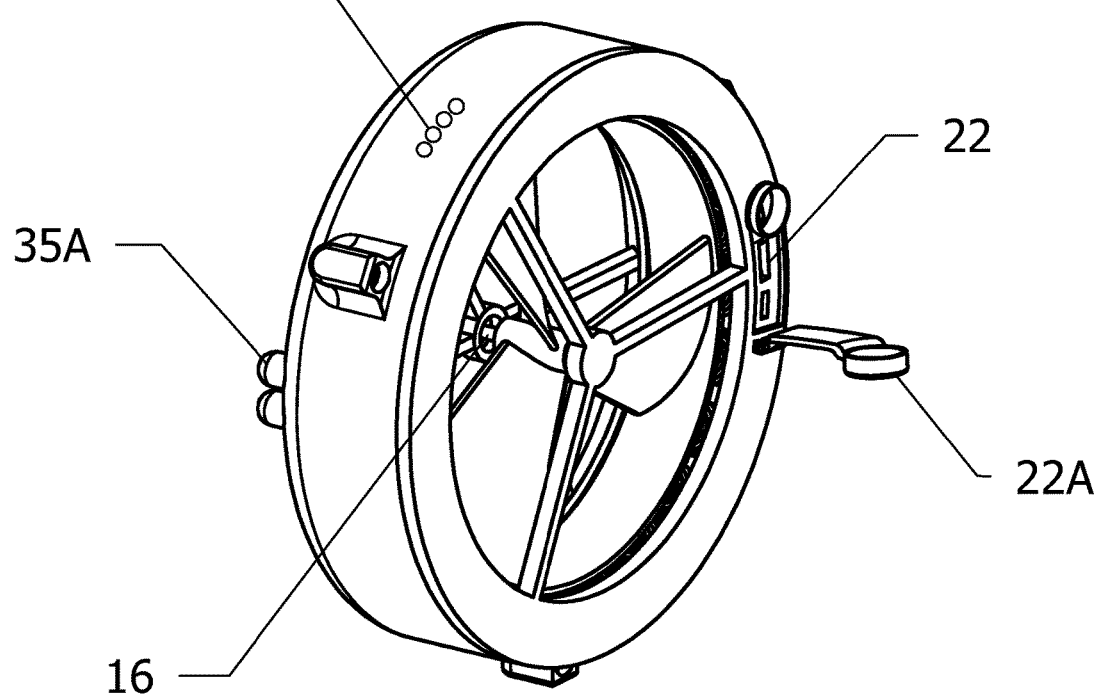
FIG. 4B is a bottom isometric view of an alternative embodiment of the device shown in FIG. 1, including sensors and a waterproof charging port and cap.

In a preferred embodiment, and as shown in FIG. 4B, the power management and power storage components 21B and 21A have an interface 21C to the user to communicate different metrics about the operation of the generation device 10. The metrics can include, but are not limited to, how long until the power storage component 21 is full, whether the flow speed is optimal, what percentage of the internal power storage component 21 is full, if the generator device 10 is generating electricity, and, if an external device is drawing any power, how much power the device is drawing. The communication interface 21C between the generator device 10 and a user can occur several ways such as, but not limited to, LEDs, display, mobile app, and wired relay, and wireless relay.

In certain embodiments, and as shown in FIG. 12, additional modules 26 can be coupled to the outside of the casing 11 as to increase the overall electrical power storage capacity of the device 10.

Fluid Analysis System. The generation device 10 can also be used to analyze the fluid moving through the system for a variety of different metrics measured by sensors 35A that include, but are not limited to, velocity, temperature, viscosity, turbulence, and/or oxygen levels. For example, a researcher can use the generator device 10 to power electronics and, at the same time, collect data on the fluid movement flowing interacting with fluid analysis sensors 35A (as shown in FIG. 4B) and interpreted through a fluid analysis system 35 (as shown in FIG. 3). Data collected by the sensors 35A can be stored internally and analyzed internally or sent to an external collection system such as, for example, a cloud based system or physical cable. In an environmental setting in which wireless data transfer is possible, the data collection may upload to larger storage, when appropriate, while energy is being generated. This collection and analysis of fluid metrics can be part of a data measurement and collection system for measuring, not only the metrics of the fluid stream, but also the characteristics of the induced electrical current, the power storage component and the power management component (as described above).

The fluid analysis system 35 also can generally analyze the body of fluid that the generator is placed. In certain embodiments this system can monitor environmental variables such as but not limited to temperature, fluid velocity, turbulence of the fluid, as well as possible chemical compositions of the fluid. Preferably, generator device 10 provides the power necessary to operate the fluid analysis system 35.

In one embodiment, the fluid analysis system 35 can be used to adapt the generator device 10 to increase its efficiency in but not limited to real time or though communication with the user of the generator device 10. The fluid analysis system 35 can be used to change various components and elements of the generator device 10, such as, but not limited to, the pitch of the propellers 13, the cross-sectional area of the mouth 27A of cone 27, the orientation of the generator device 10 to fluid movement 30, and location in the stream. The fluid analysis system 35 also can use the data received to make changes automatically to increase efficiency of the generator device 10 or through communication with the user to guide the user in making the necessary changes to increase the efficiency of the device 10 through communications channels including, but not limited to, a light interface, communication through an app, communication through a cloud based interface.

In an alternative embodiment, the fluid analysis system 35 collects data internally and stores it internally to be seen by the user once the device 10 is removed for the fluid.

In a further embodiment, and as shown in FIG. 4A, the fluid analysis system is associated with sensors 35A on the device 10, and the data collected is relayed to a collection and analysis system in the local environment wirelessly or via a physical information transfer system such as, but not limited to, a wire. Alternatively, the data collected could be relayed to a collection and analysis system held on the cloud. It will be appreciated that the transfer and storage means and locations can be varied based on application environment without departing from the spirit of the present invention.

In another embodiment of the present invention, the monitoring of the power coming from the generator device 10 as propeller-rotor assembly 12 rotates in a fluid stream 30 can be used as a means of analyzing different variables solely or in tandem with other sensors placed on or within the generator device 10. Variables of the fluid stream 30 that can be measured by analyzing the output of the generator device 10 include, but are not limited to, the current, voltage, or power being produced by the generator device 10. Variables of the fluid stream 30 that can be measured by analyzing the output of the generator device 10 include but are not limited to velocity, and turbulence.

Size and Weight Characteristics of Generator Device. The present invention, as described above, presents a generator device 10 that is scalable and that has a predetermined size, volume, and weight that allows device 10 to be used in different environments and applications. For example, in a preferred embodiment, device 10 is portable and easily deployed by a user in remote environments. Generator 10 device can be easily carried in a backpack, for example, or otherwise carried in an easy manner by a user. As such, the size and weight of the hydroelectric generator device 10 of the present invention differs from large-scale hydroelectric generators which are heavy, cumbersome, built-in, virtually immobile without disassembly, and therefore, are not easily carried and deployed by a hiker or other similar user. Instead, the size and weight of the device 10 are such that the device 10 is portable and easily used, as already described. In the context, device 10 can have differences in size and weight depending on the embodiment of the invention and the elements and components included with the device 10. Variations in size and weight can also result from adaption to differing environments and optimization of the device 10 for specific applications. The device 10 can be scaled and adapted for different environments and optimized power needs and use cases while still reaming true to the spirit of the invention. For example, an organization may need power in a remote location to power a medical tent near a stream, and the power need of this organization is much larger than that of a kayaker spending multiple days camping. To accommodate this larger power need, device 10 can be easily scaled to a larger size and optimized based on the power needs and environment of the user. In general, the weight of device 10 can vary from about 0.05 kg to about 60 kg. In a most preferred embodiment, the weight of a portable device 10 varies from about 50 grams to about 500 grams. With added components in certain embodiments, the upper end of the weight range of device 10 grams is 800 grams.

Likewise, for optimal use of device 10, volumetric size may vary to fit a specific application and also depends on the embodiment of device 10. Volumetric size encompasses all space located within the profile of the design and not the total volume of material used to create the design (e.g. a wire frame sphere would have the same volumetric size as a solid sphere with the same radius). Changes in shape to accommodate certain components, such as module 26 or cone 27, may account for variation in volumetric size and overall weight. In a preferred embodiment of a portable device 10, volumetric size may vary from about 60 cubic centimeters to about 400 cubic centimeters, and a preferred diameter of device 10 may range from 10 cm to 40 cm. Alterations in the geometries that satisfy the functional requirements of the system may change size shape and weight while adhering to the spirit of the present invention. Differences in size and weight are attributed to possible combinations of subsystems included in paragraphs below. Variations in size and weight are included for differing environments and optimization of the device for specific applications.

It will be understood that each of the device, elements and components described above, or two or more together, may also find a useful application in other types of constructions differing from the types described above. While the invention has been illustrated and described in certain embodiments, it is not limited to the details shown, since it will be understood that various omissions, modifications, substitutions and changes in the forms and details of the device illustrated and its operation can be made by those skilled in the art without departing in any way from the spirit of the present invention.

What is claimed is:

1. A generator device for generating an induced electrical power from the movement of a fluid stream, the generator device comprising:
    a circumferential casing with a central opening operable for placement in the fluid stream whereby the fluid stream passes through the central opening, the casing having an internal waterproof area for housing and fully enclosing a power storage system for storing the induced electrical power while the casing is placed in the fluid stream, whereby a user of the generator device can access and use the stored power as a power supply, and a power management system that receives, conditions and regulates the induced electrical power in coordination with the power storage system;
    a stator attached in a circular configuration to the casing and electrically connected to the power storage system and power management system;
    a propeller-rotor assembly located in the central opening of the casing and rotatably coupled to the casing, the propeller-rotor assembly comprising two or more propeller blades with distal ends opposite the axis of the propeller-rotor assembly and at least one magnet fixed to the distal ends of each propeller blade; and
    a tether assembly for anchoring the generator device in a moving fluid stream, wherein the tether assembly is attached, at one end, to the casing and, at the opposite end, to a fixed location relative to the moving fluid stream, and wherein the tether assembly acts to position the generator device so that the rotational plane of the propeller-rotor assembly is substantially perpendicular to the directional movement of the fluid stream and the movement of fluid stream through the generator device causes the propeller-rotor assembly to rotate and, thereby, through interaction with the stator, to generate the induced electrical power; and
    wherein the generator device has a weight and size that is scalable for use of the generator device.

2. The generator device of claim 1, further comprising a data measurement and collection system for measuring the metrics of the fluid stream and the characteristics of the induced electrical current, the power storage component and the power management component.

3. The generator device of claim 2, wherein the data measurement and collection system includes at least one sensor attached to the casing.

4. The generator device of claim 1, wherein the at least one permanent magnet of rotor assembly is attached to a distal ring that is attached to the distal ends of the propeller blades.

5. The generator device of claim 1, wherein the generator device further comprises a port whereby the user can access the stored electrical power in the power storage component as a power supply.

6. The generator device of claim 1, wherein the generator device further comprises a second propeller assembly that operates to cause the casing and stator to rotate in a direction opposite to the rotational direction of the propeller-rotor assembly.

7. The generator device of claim 6, wherein the second propeller assembly is attached to the outer circumference of the casing.

8. The generator device of claim 6, wherein the second propeller assembly is attached to the upper surface of the casing.

9. The generator device of claim 1, wherein the propeller-rotor assembly is rotatably mounted to a central shaft that is attached to an upper strut and a lower strut, the upper and lower struts spanning the central opening of the casing.

10. The generator device of claim 1, wherein the propeller-rotor assembly is rotatably mounted to the internal wall of the casing.

11. The generator device of claim 1, wherein the tether assembly includes two or more tethers that attach to symmetrically spaced mounts on the casing.

12. The generator device of claim 1, wherein the tether assembly includes a swivel connector that enables the tether assembly to rotate relative to the attached fixed location.

13. The generator device of claim 1, wherein the tether assembly includes a cone system for directing the fluid stream into the central opening and propeller-rotor assembly of the casing.

14. The generator device of claim 1, further comprising a fluid analysis system for measuring fluid stream metrics.

15. The generator device of claim 11, wherein at least one of the two or more tethers also functions as a conduit for communication of data from the generator device to a user.

16. The generator device of claim 1, further comprising a second concentric ring of rotating permanent magnets external to the stator.

17. The generator device of claim 1, wherein the generator device has a weight and size with a predetermined limit that enables the generator device to be individually carried and deployed by a single user.

18. A portable hydroelectric generator device for generating an induced electrical power from the movement of a fluid stream, the generator device comprising:
    a circumferential casing with a central opening operable for placement in the fluid stream whereby the fluid stream passes through the central opening, the casing having an internal waterproof area for housing and fully enclosing a power storage system for storing the induced electrical power while the casing is placed in the fluid stream, whereby a user of the generator device can access and use the stored power as a power supply, and a power management system that receives, conditions and regulates the induced electrical power in coordination with the power storage system;
    a stator attached in a circular configuration to the casing and electrically connected to the power storage system and power management system; and
    a propeller-rotor assembly located in the central opening of the casing and rotatably coupled to the casing, the propeller-rotor assembly comprising two or more propeller blades with distal ends opposite the axis of the propeller-rotor assembly and at least one magnet fixed to the distal ends of each propeller blade; and
    wherein the generator device has a predetermined weight and size that is scalable.

19. The hydroelectric generator device of claim 18, further comprising a tether assembly for anchoring the generator device in a moving fluid stream, wherein the tether assembly is attached, at one end, to the casing and, at the opposite end, to a fixed location relative to the moving fluid stream, and wherein the tether assembly acts to position the generator device so that the rotational plane of the propeller-rotor assembly is substantially perpendicular to the directional movement of the fluid stream and the movement of fluid stream through the generator device causes the propeller-rotor assembly to rotate and, thereby, through interaction with the stator, to generate the induced electrical power.

20. A hydroelectric generator device for generating an induced electrical power from the movement of a fluid stream, the generator device comprising:
    a circumferential casing with a central opening operable for placement in the fluid stream whereby the fluid stream passes through the central opening, the casing having an internal waterproof area for housing and fully enclosing a power storage system for storing the induced electrical power while the casing is placed in the fluid stream, whereby a user of the generator device can access and use the stored power as a power supply, and a power management system that receives, conditions and regulates the induced electrical power in coordination with the power storage system;
    a stator attached in a circular configuration to the casing and electrically connected to the power storage system and power management system; and
    a propeller-rotor assembly located in the central opening of the casing and rotatably coupled to the casing, the propeller-rotor assembly comprising two or more propeller blades with distal ends opposite the axis of the propeller-rotor assembly and at least one magnet fixed to the distal ends of each propeller blade; and
    wherein the generator device has a limited weight and size that enables the generator device to be individually carried and deployed by a single user.

* * * * *